United States Patent
O'Connor

(10) Patent No.: US 7,519,791 B2
(45) Date of Patent: Apr. 14, 2009

(54) ADDRESS CONVERSION TECHNIQUE IN A CONTEXT SWITCHING ENVIRONMENT

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 10/773,847

(22) Filed: Feb. 5, 2004

(65) Prior Publication Data

US 2005/0177701 A1    Aug. 11, 2005

(51) Int. Cl.
*G06F 12/06* (2006.01)
(52) U.S. Cl. .................. 711/207; 711/145
(58) Field of Classification Search .......... 711/202, 711/203, 206, 209, 219, 207, 208, 130, 145, 711/138
See application file for complete search history.

(56) References Cited

U.S. PATENT DOCUMENTS

| | | | | |
|---|---|---|---|---|
| 6,751,583 | B1* | 6/2004 | Clarke et al. | 717/127 |
| 6,754,784 | B1* | 6/2004 | North et al. | 711/145 |
| 6,772,315 | B1* | 8/2004 | Perego | 711/207 |
| 6,907,600 | B2* | 6/2005 | Neiger et al. | 711/207 |
| 2002/0062434 | A1* | 5/2002 | Chauvel et al. | 711/207 |
| 2004/0024839 | A1* | 2/2004 | Okochi et al. | 709/214 |
| 2004/0117592 | A1* | 6/2004 | Day et al. | 711/207 |

FOREIGN PATENT DOCUMENTS

WO    WO 01/57676    8/2001

OTHER PUBLICATIONS

PCT/US2005/001234 International Search Report and Written Opinion Mailed Jan. 30, 2006.
Intel, "*Intel® XScale™ Microarchitecture* for the PXA255 Processor", User's Manual, Mar. 2003, pp. 198, Order No. 278796.

* cited by examiner

*Primary Examiner*—Pierre-Michel Bataille
(74) *Attorney, Agent, or Firm*—Trop, Pruner & Hu, P.C.

(57) ABSTRACT

According to some embodiments, a memory management unit receives a virtual address and provides a corresponding physical address. The memory management unit stores generated virtual address-to-physical address translations. If a virtual address-to-physical address translation is available for a particular virtual address, the memory management unit retrieves the corresponding physical address. If a translation is not available, the memory management unit generates the corresponding physical address from the virtual address. The memory management unit converts the virtual address to a modified virtual address using a process identifier and then performs a page table walk using the modified virtual address, generating the physical address.

24 Claims, 4 Drawing Sheets

ADDRESS CONVERSION TECHNIQUE IN A CONTEXT SWITCHING ENVIRONMENT

BACKGROUND

DESCRIPTION OF THE RELATED ART

A processor in a computing system uses memory mapping to map virtual addresses to physical addresses. The address space generated by, for example, the execution unit of the processor, is referred to as the virtual address space. The addresses that correspond to hardware memory locations available on the system are referred to as physical address.

A processor may implement an additional level of address remapping for process or context switching. A process identifier associated with a context may be used to remap addresses. The use of process identifiers and remapping alleviates the need to flush or invalidate a cache on process switches.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

According to some embodiments, a memory management unit receives a virtual address and provides a corresponding physical address. The memory management unit stores generated virtual address-to-physical address translations. If a virtual address-to-physical address translation is available for a particular virtual address, the memory management unit retrieves the corresponding physical address. If a translation is not available, the memory management unit generates the corresponding physical address from the virtual address. The memory management unit converts the virtual address to a modified virtual address using a process identifier and then performs a page table walk using the modified virtual address, generating the physical address.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/ or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
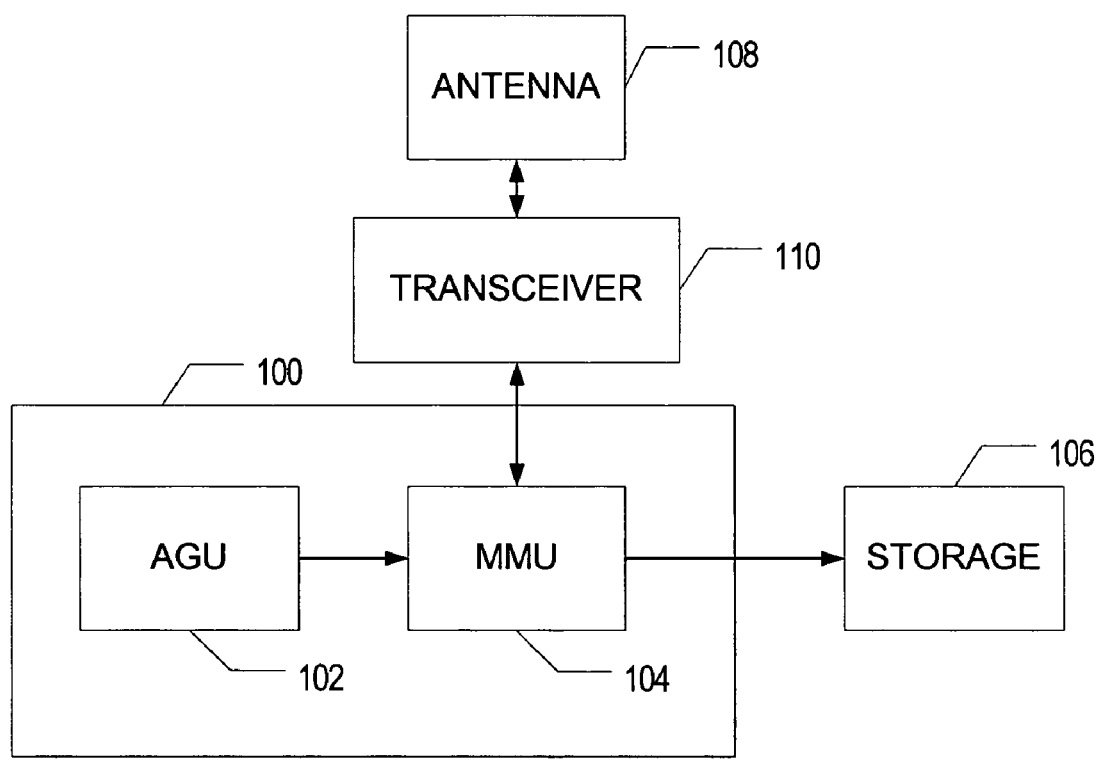
FIG. 1 illustrates various logic blocks of a computing system according to an embodiment of the present invention.

FIG. 1 illustrates various logic blocks of a computing system according to an embodiment of the present invention. A processor 100 includes an address generation unit (AGU) 102 and a memory management unit (MMU) 104. AGU 102 may be, for example, an arithmetic logic unit (ALU) that generates data addresses or, for example, an incrementor that generates instruction addresses. The addresses generated by AGU 102 are virtual addresses. MMU 104 converts the virtual addresses into physical addresses. Those physical addresses are used to access, for example, to read or write a storage 106. Storage 106 may be internal or external to processor 100.

Processor 100 represents a central processing unit of any type of architecture, including an ARM, a CISC or a RISC type architecture. Storage 106 represents one or more mechanisms for storing data. For example, storage 106 may include read only memory (ROM), random access memory (RAM), magnetic disk storage mediums, optical storage mediums, and/or flash memory devices. While one embodiment will be described in which the invention is implemented in a single processor computing system, embodiments of the invention could be implemented in a multi-processor computing system.

Processor 100 can be in any of a number of computing and communication systems including, but not limited to, mainframes, minicomputers, servers, workstations, personal computers, notepads, personal digital assistants, various wireless communication devices that may include one or more antenna (e) 108 and transceiver 110 and embedded systems, just to name a few.

Figure 2:
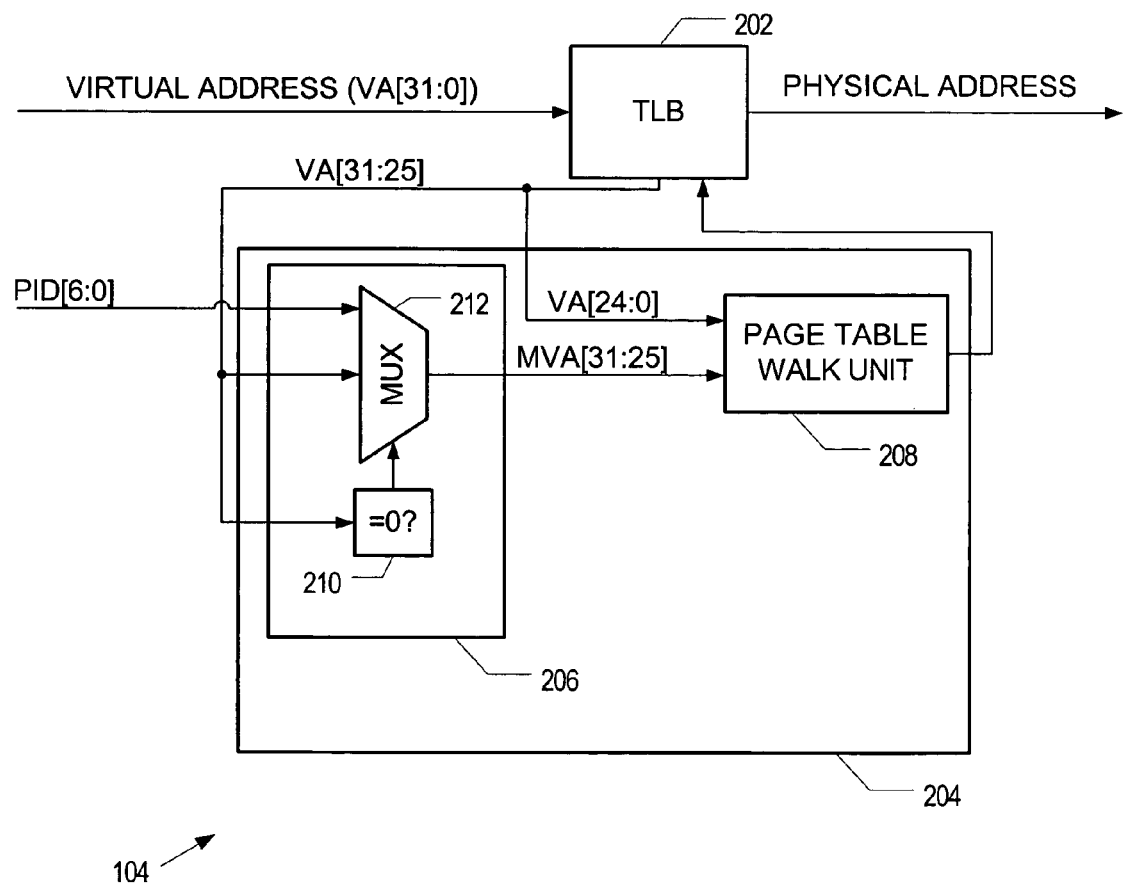
FIG. 2 illustrates a block diagram of a memory management unit according to an embodiment of the present invention.

FIG. 2 illustrates a block diagram of memory management unit 104 according to an embodiment of the present invention. MMU 104 receives a virtual address and provides a corresponding physical address. First, a determination is made whether a translation for the virtual address is contained within a store, for example, a translation look-aside buffer (TLB) 202. TLB 202 contains one or more virtual address-to-physical address translations. If a translation for the virtual address is not within TLB 202, the translation is generated by TLB miss handling unit 204. TLB miss handling unit 204 includes conversion logic 206 and a page table walk unit 208. Conversion logic 206 converts a virtual address (VA) into a modified virtual address (MVA). Conversion logic 206 may include, for example, determination logic 210 to determine if one or more upper bits of the virtual address, for example, the seven upper bits VA[31:25], are equal to zero, and a multiplexer 212 to select the upper bits of a modified virtual address (MVA). For example, multiplexer 212 selects a process identifier, PID[6:0] to replace the upper seven bits of the virtual address if those bits of the virtual address are equal to zero. Otherwise, the upper seven bits of the virtual address are selected.

The process identifier (PID) may be stored in a register on processor 100 and may be associated with a particular process. For a seven-bit PID, the virtual address may be remapped to one of 128 "slots" in a 4 Gbyte address space. This process identifier remapping may be useful for operating system management of processes that map to the same virtual address space. In those cases, virtually mapped caches would not require invalidating on a process switch until, for example, such time as the PID value rolls over or a PID value is reused. An address that has yet to be modified by the PID ("PIDified") is referred to as a virtual address (VA). An address that has been through conversion logic 206, but not translated into a physical address, is referred to as a modified virtual address (MVA).

Page table walk unit 208 generates a physical address using the modified virtual address. Memory addressing schemes often use paging to implement virtual memory. When using paging, the virtual address space may be divided into fixed-sized blocks called pages, each of which may be mapped onto any of the physical addresses. For example, page table walk unit 208 determines and maintains, according to a paging algorithm, the current mappings for the virtual to physical addresses using page tables. The page tables are often in main memory and accessing them may be time consuming. To speed up the paging translations, some of the generated virtual address-to-physical address translations are stored in TLB 202.

While these translated memory addresses are described herein as physical memory addresses, in alternative embodiments these translated memory addresses could be used for any number of purposes. For example, further translations could be performed on these translated memory addresses before physical addresses are achieved. In addition, while one embodiment is described in relation to translating a virtual memory address space, alternative embodiments could use the invention to assist in the translation of any type of addresses.

Some or all of the virtual address-to-physical address translations stored in TLB 202 may be invalidated when the process identifier is updated. The process identifier is updated, for example, when a process or context is switched. Because TLB 202 may contain translations for virtual addresses that have null upper bits and therefore are specific to a particular process, those translations must be invalidated when the process switches. Invalidating the translations in TLB 202 may be performed by software. Alternatively, hardware may detect the change and perform the invalidation automatically.

Figure 3:
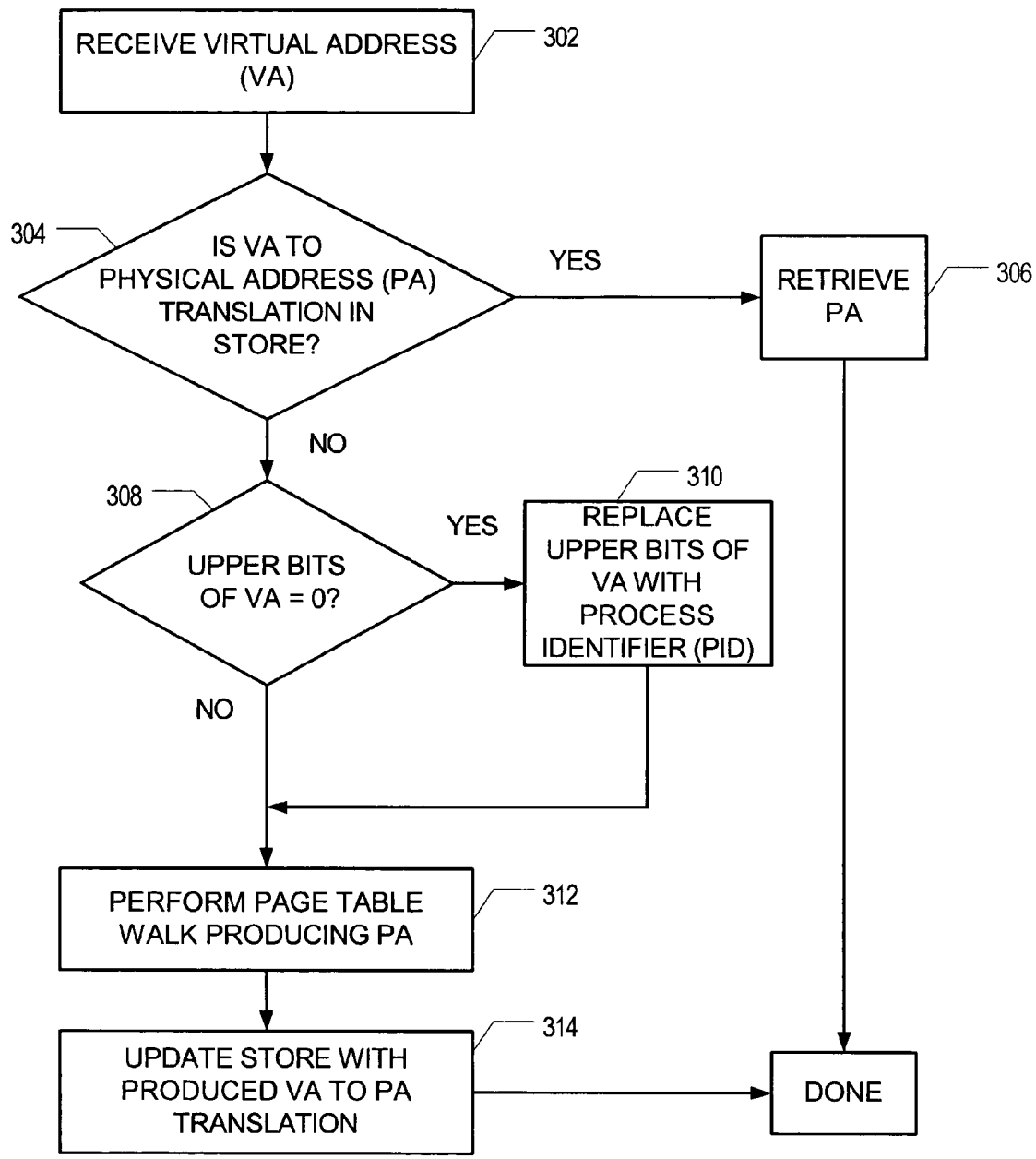
FIG. 3 illustrates a flow diagram of virtual address to physical address conversion according to an embodiment of the present invention.

FIG. 3 illustrates a flow diagram of processes performed by processor 100 upon a request to MMU 104 to translate a virtual address into its corresponding physical address according to one embodiment of the present invention.

MMU 104 receives a virtual address, process block 302. A determination is made whether a translation for the virtual address is stored, for example, in TLB 202, process block 304. If so, the physical address is retrieved, process block 306. If not, a determination is made whether the upper bits, for example, the upper seven bits, of the virtual address are null, that is, equal to zero, process block 308. If so, the upper bits are replaced with the process identifier (PID), process block 310. Next, using the PIDified virtual address, that is, the modified virtual address (MVA), a page table walk is performed, generating the physical address, process block 312. TLB 202 may be updated with the new virtual address-to-physical address translation, process block 314.

Figure 4:
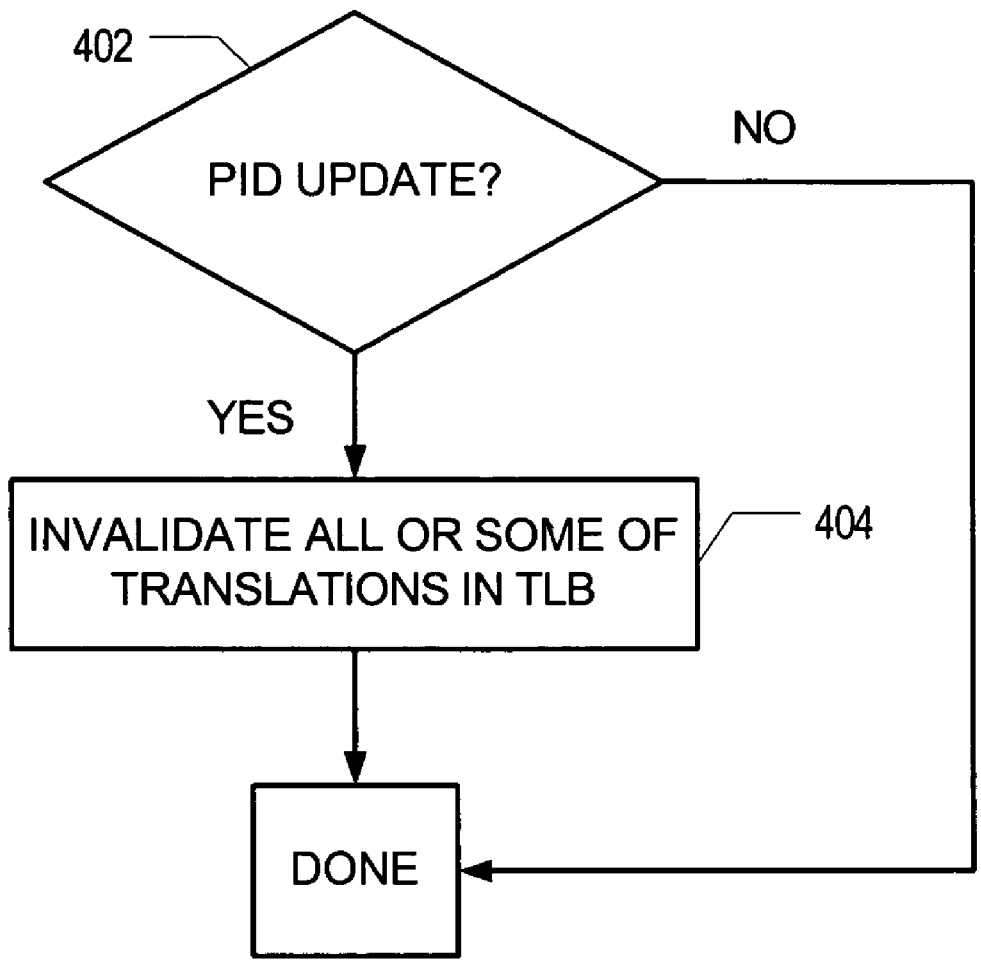
FIG. 4 illustrates a process switching flow according to an embodiment of the present invention.

FIG. 4 illustrates a process switching flow according to an embodiment of the present invention. A determination is made whether the process identifier (PID) has been updated, process block 402. If the PID has been updated, all or part of the TLB is invalidated, process block 404. The entire TLB may be invalidated. Alternatively, only the translations where the upper bits of the virtual address are null may be invalidated.

The techniques described above may be embodied in a computer-readable medium for configuring a computing system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:
    receiving a virtual address at a memory management unit;
    determining if the virtual address has a translation to a physical address in a storage;
    if not, generating a modified virtual address from the virtual address; and
    translating the modified virtual address into a physical address.

2. The method as recited in claim 1, wherein generating the modified virtual address comprises replacing one or more bits of the virtual address with a process identifier if the one or more bits are equal to a predetermined value.

3. The method as recited in claim 1, wherein translating the modified virtual address comprises performing a page table walk.

4. The method as recited in claim 1, further comprising invalidating all translations in the storage if a process identifier changes.

5. The method as recited in claim 1, further comprising invalidating only translations in the storage having a virtual address portion that has one or more bits equal to a predetermined value.

6. The method as recited in claim 1, further comprising placing any generated translations into the storage.

7. The method as recited in claim 1, wherein the virtual address is a data address.

8. The method as recited in claim 1, wherein the virtual address is an instruction address.

9. A memory management unit configured to receive a virtual address and provide a corresponding physical address, the memory management unit comprising:
a storage containing one or more virtual address-to-physical address translations;
conversion logic to generate a modified virtual address from the virtual address if a virtual address-to-physical address translation for the virtual address does not exist in the storage; and
a page table walk unit configured to convert the modified virtual address into the corresponding physical address.

10. The memory management unit as recited in claim 9, wherein the conversion logic is configured to replace one or more bits of the virtual address with a process identifier if the one or more bits comprises a predetermined value.

11. The memory management unit as recited in claim 10, wherein the predetermined value is zero.

12. The memory management unit as recited in claim 9, wherein the memory management unit is configured to receive the virtual address from an arithmetic logic unit.

13. The memory management unit as recited in claim 9, wherein the memory management unit is configured to receive the virtual address from an incrementor.

14. The memory management unit as recited in claim 9, wherein the virtual address comprises a data address.

15. The memory management unit as recited in claim 9, wherein the virtual address comprises an instruction address.

16. The memory management unit as recited in claim 9, wherein the one or more virtual address-to-physical address translations are invalidated upon updates to a process identifier.

17. The memory management unit as recited in claim 9, wherein only virtual address-to-physical address translations having a virtual address portion with one or more bits equal to a predetermined value are invalidated upon updates to a process identifier.

18. The memory management unit as recited in claim 9, wherein the storage is configured to store one or more most recently generated virtual address-to-physical address translations.

19. A system comprising:
an antenna;
a memory; and
a processor coupled to the antenna and memory, the processor comprising:
an address generation unit; and
a memory management unit configured to receive a virtual address from the address generation unit and provide a corresponding physical address, the memory management unit comprising:
a storage containing one or more virtual address-to-physical address translations;
conversion logic to generate a modified virtual address from the virtual address if a virtual address-to-physical address translation for the virtual address does not exist in the storage; and
a page table walk unit configured to convert the modified virtual address into the corresponding physical address.

20. The system as recited in claim 19, wherein the conversion logic is configured to replace one or more bits of the virtual address with a process identifier if the one or more bits are equal to a predetermined value.

21. The system as recited in claim 19, wherein the address generation unit comprises an arithmetic logic unit.

22. The system as recited in claim 19, wherein the address generation unit comprises an incrementor.

23. The system as recited in claim 19, wherein the one or more virtual address-to-physical address translations are invalidated upon updates to a process identifier.

24. The system as recited in claim 19, wherein only virtual address-to-physical address translations having a virtual address portion with one or more bits equal to a predetermined value are invalidated upon updates to a process identifier.

* * * * *